(12) United States Patent
Veldkamp et al.

(10) Patent No.: US 9,993,008 B2
(45) Date of Patent: Jun. 12, 2018

(54) PEELER CARRIAGE WITH KNIFE ASSEMBLY

(71) Applicant: Marel, Inc., Lenexa, KS (US)

(72) Inventors: Brent M. Veldkamp, Cumming, IA (US); Mattheus C. Willems, Des Moines, IA (US); David W. Nida, Des Moines, IA (US); Emile A. Burgers, Hattemerbroek (NL)

(73) Assignee: Marel, Inc., Lenexa, KS (US)

(*) Notice: Subject to any disclaimer, the term of this patent is extended or adjusted under 35 U.S.C. 154(b) by 50 days.

(21) Appl. No.: 15/343,532

(22) Filed: Nov. 4, 2016

(65) Prior Publication Data
US 2018/0125080 A1  May 10, 2018

(51) Int. Cl.
| A22C 11/00 | (2006.01) |
| A22C 13/00 | (2006.01) |
| A22C 17/00 | (2006.01) |
| A22C 17/02 | (2006.01) |
| B26D 7/26 | (2006.01) |

(52) U.S. Cl.
CPC .......... *A22C 11/003* (2013.01); *A22C 13/00* (2013.01); *A22C 17/0006* (2013.01); *A22C 17/0093* (2013.01); *A22C 17/02* (2013.01); *B26D 7/2628* (2013.01)

(58) Field of Classification Search
CPC .................................................... A22C 13/00
USPC .............................................. 452/52, 57, 66
See application file for complete search history.

(56) References Cited

U.S. PATENT DOCUMENTS

| 2,644,979 | A | | 7/1953 | Ball |
| 2,702,404 | A | | 2/1955 | Rufenach |
| 3,023,452 | A | | 3/1962 | James et al. |
| 4,118,828 | A | * | 10/1978 | Melanson ............ A22C 11/003 452/50 |
| 5,246,395 | A | | 9/1993 | Zirps et al. |
| 5,649,858 | A | * | 7/1997 | Williams ............ A22C 11/003 452/50 |
| 5,928,073 | A | * | 7/1999 | Andersson ........... A22C 11/003 452/50 |
| 7,377,842 | B2 | * | 5/2008 | Painter ................. A22C 11/003 452/50 |

FOREIGN PATENT DOCUMENTS

WO   WO96/17522 A1   6/1996

OTHER PUBLICATIONS

International Searching Authority, "Invitation to Pay Additional Fees and, Where Applicable, Protest Fee", for PCT/US2017/059896, dated Jan. 4, 2018, 12 pages.

* cited by examiner

*Primary Examiner* — Richard T Price, Jr.
(74) *Attorney, Agent, or Firm* — Zarley Law Firm, P.L.C.

(57) ABSTRACT

A machine for peeling sausages having an adjustable carriage assembly and an adjustable knife holder with one or more blade holders.

21 Claims, 14 Drawing Sheets

PEELER CARRIAGE WITH KNIFE ASSEMBLY

BACKGROUND OF THE INVENTION

The present invention is directed to a peeler apparatus with an adjustable peeler carriage for peeling a strand of sausage and more particularly to a peeler carriage having one or more knife assemblies.

Sausages, wieners, and the like are conventionally made by extruding a meat emulsion into an elongated hollow cylindrical casing. The casing is then rotated and twisted at given intervals to create a chain or string of linked casings with each linked casing encompassing a single sausage or wiener. This string of linked casings is conventionally deposited on a conveyor device and taken to a smoke house where the encased meat emulsion is dried, smoked, and cooked and potentially chilled. Then, before the sausage or wieners are packaged for sale to the consumer, the casing material is removed from the cooked meat emulsion. Devices which remove the casing material are commonly referred to as "peelers" in the industry.

Sausages, including franks that are linked and cooked are most often peeled, where the casing is removed, prior to packaging. To peel the sausage, typically a knife, having a blade, cuts the casing along the length of the sausage, parallel to the centerline of the sausage. The cut must extend through the casing without damaging the sausage. To ensure proper peeling, the blade cuts the casing at the leading edge and then along the length of the casing. To accomplish this, the knife is mounted so that the blade will lift away from and return to the centerline of the sausage through the use of a spring that presses the knife against the sausage.

A strand of food product includes a string of interconnected sausages separated by constrictions. When producing strands of small food products, such as cocktail products, the cut is short and therefore the opening for the peeled product to exit the casing is small. As a result, short products are very difficult to cut and peel because of the limited length and weight of the product, as well as the increased number of constrictions. Also other types of sausages besides cocktails having more adhesion of the casing to the meat product will be hard to cut and peel.

Presently, peelers have a carriage with a knife assembly adjustably mounted to the carriage. The knife assembly includes a blade attached to a blade holder and a spring that provides a downward force so that the blade presses against the length of the sausage. The carriage position to the sausage determines the force with which the hold down wheels will push into the product and creating tensioning on the top side outer surface of the casing where the vertical cut is made. The adjustability of the knife assembly allows for manual adjustment of the downward force of the blade against the sausage.

The carriage is also adjustably mounted to a rail or a slide, so that the carriage may be raised and lowered to the centerline of sausages having different diameters. Typically, to adjust the position of the carriage, a securing wing screw is loosened, the carriage lifted or lowered, and the swing screw tightened usually while the machine is not running.

The knife assembly is positioned at a second set of drive wheels that transport the strand through the peeler. Directly after the knife is a set of three air nozzles. A first nozzle blows directly on the lengthwise cut made by the tip of the blade, causing the casing to open and separate from the sausage. The second and third nozzles are positioned downstream of the first nozzle further opening the casing and blowing the casing onto a vacuum wheel. Holes in the vacuum wheel having a vacuum pressure assist in removing the casing from the sausage and the casing leaves the peeler through a vacuum hose or suction line. The peeled sausages exit the peeler and are taken away by a conveyor or deposited in a container.

Other peelers typically use steam to loosen the casing material from the cooked meat emulsion; a knife element thereupon slits the casing material; and a blast of compressed air is sometimes used to cause the casing material to be removed from the cooked and finished meat product.

While helpful, known peelers still have difficulty peeling sausages and particularly short products. Short products require a short cut and opening for the product to exit the casing and opening the casing sufficiently enough to catch the casing with the applied vacuum is very difficult. When the sausage is not adequately cut at the ends, the sausages are not appropriately released from the casings which leads to product jams that halt operations. As a result, greater operator attention is needed. Other peelers have certain shortcomings. First of all, the knife elements used for the slitting operation often cut too deep and damage the cooked meat emulsion. Further, the knife elements are not adapted to slice adequately the casing at the ends of the sausage or wieners where the adjacent products are linked. As a result, the casing material must be torn from the cooked product at the ends thereof where the casing has not been effectively sliced.

In addition, with existing peelers, it is sometimes difficult to separate or pull the casing material from the ends of a sausage or wiener by virtue of the geometry of the product at the linked portions between individual linked products. This difficulty flows from the fact that the casing material being removed is not being pulled at a right angle with respect to the surface of the meat product.

A further shortcoming of existing peelers is that while steam is used to loosen the casing material from the cooked product, the product and the components engaging the product are often heated to a relatively high temperature, but less than 150° F. or so. Thus, even with steam entering existing peelers at a temperature of 180° F. or above, heat losses experienced in these devices permit the effective temperature of the surface of the meat product and the equipment to fall below the 150° F. level. The problem that this creates is that bacteria thrive in this heated condition up to 150° F. or so, and this compounds the cleaning responsibilities for the machine and in some cases could contaminate the food product.

It is therefore a principal object of this invention to provide a method and means for removing casings from sausages or the like which has a cutting blade that will not damage the meat product while the casing is being sliced.

An objective of the present invention is to provide a carriage that is easy to mount to a cabinet and adjust to the different product sizes with a true, reproducible and fixed adjustment.

Another objective of the present invention is to provide a knife assembly adjustably mounted to the carriage to permit precise positioning of the knife assembly to the hold down wheels holding down the product to be cut before peeling to apply the correct knife pressure.

A still further objective of the present invention is to provide a peeling assembly that makes at least one cut, in a more reproducible and precise way in a sausage to separate a casing more easily.

A further object of this invention is to provide a method and means for removing casings from sausages or the like wherein the encased linked meat product can have the casing material effectively sliced at the ends thereof as well as throughout the length thereof.

A still further object of this invention is to provide a method and means for removing casings from sausages or the like wherein force is exerted on the linked product to expel the product from the casing material and to maintain the casing material being removed at an efficient angle of departure from the meat product to enhance the casing removal phenomena.

A still further object of this invention is to provide a method and means for removing casings from sausages or the like wherein steam is propelled through the conduit carrying the linked product to be peeled, and the temperature of the steam is retained within the apparatus throughout the peeling operation to a level above 150° F. to prevent bacterial growth.

A still further object of this invention is to provide a method and means for removing casings from sausages or the like wherein the peeling apparatus can be easily disassembled without tools; and where the entire machine is sanitary and easily cleaned, including the outside surface thereof, none of which are horizontal so as to provide immediate and automatic drainage.

Figure 11:
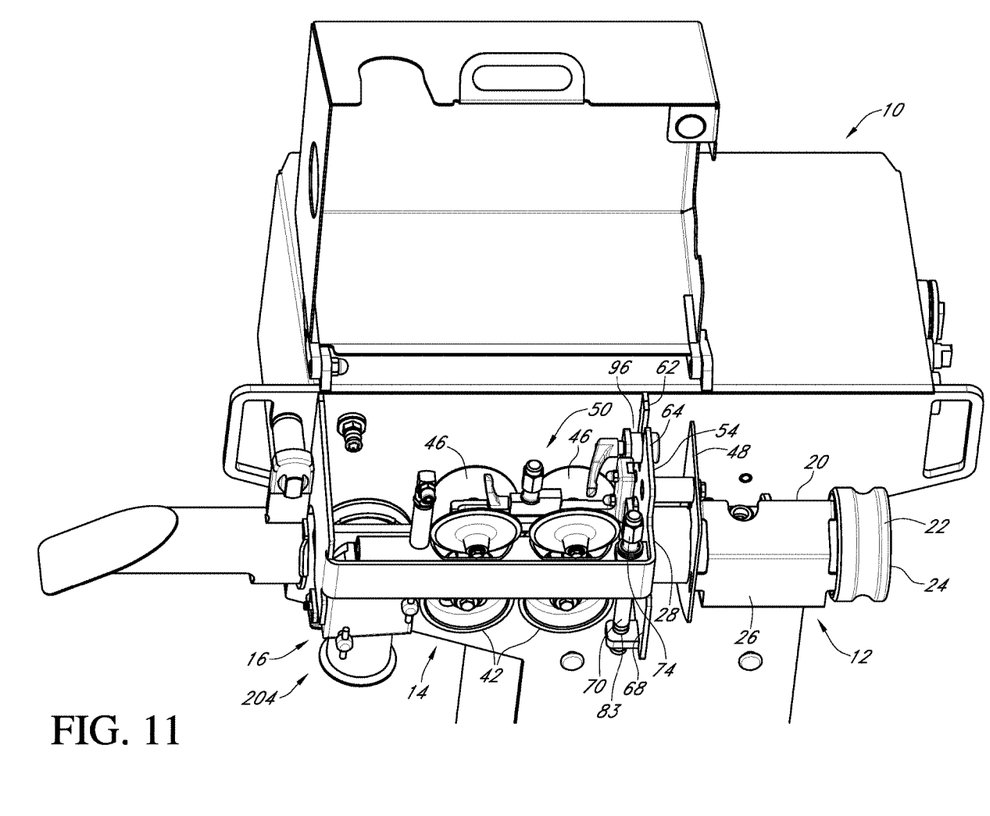
FIG. 11 is a perspective view of a peeling machine.
Figure 12:
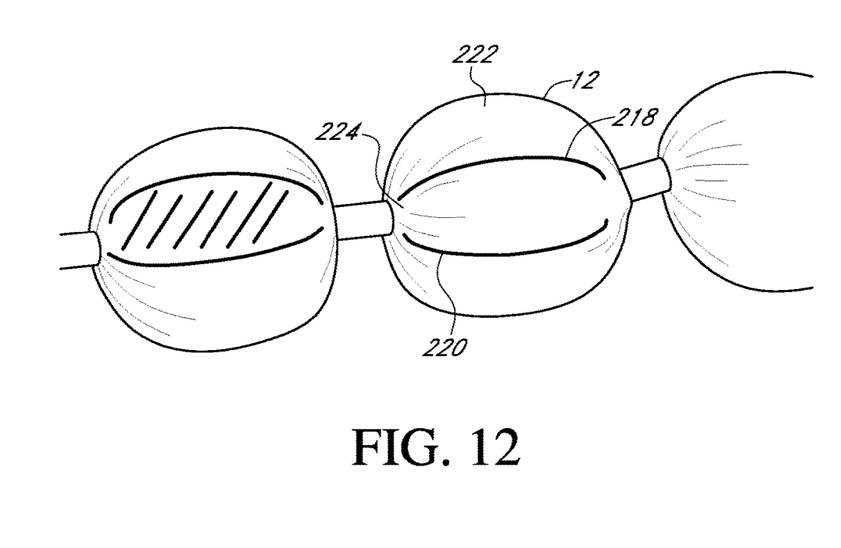
FIG. 12 is a perspective view of a sausage strand having a double cut.
Figure 13:
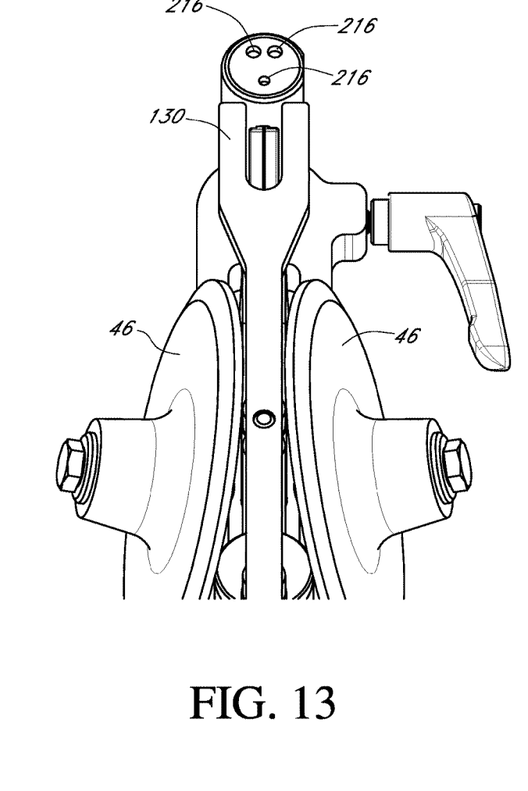
FIG. 13 is a bottom perspective view of an adjustable knife assembly.
Figure 14:
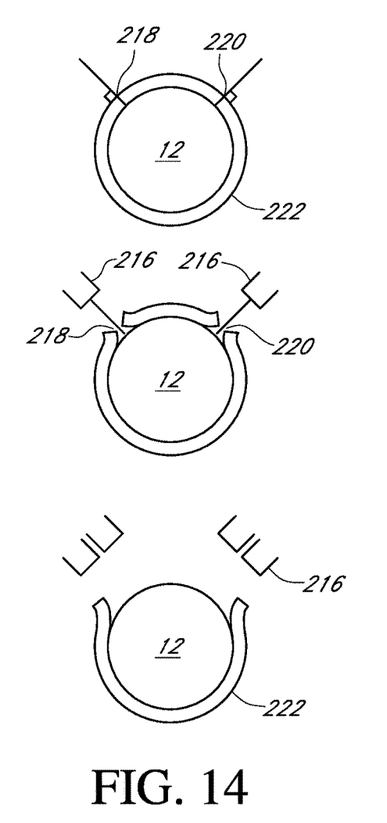
FIG. 14 is an end view of a sausage being cut with double cut.

To overcome this problem, at least two blade holders 152 with blades 178 are connected to arms 130 that are connected to the second end 122 of the adjustment screw 116. The at least two blade holders 152 are positioned to make at least two cuts 218, 220 in the sausage as shown in FIG. 11. Preferably, after the double cut is made and the sausage is transported downstream a first set of air nozzles 216 blows open the sides of the casing 222 away from the meat portion. Once loosened, and as the sausage is transported further downstream, a second set of air nozzles 216, preferably farther apart, further loosens the casing 222 away from the sausage 12. As the vacuum/pincher wheel 206 grabs the casing 222, the forward portion 224 of the casing breaks so that the sausage continues to travel downstream while the casing 222 is removed by the vacuum assembly 204.

An objective of the double knife peeler is to open the area in the casing in order to facilitate the sausage product to physically move out of the small opening cut in the casing.

A further objective of the double cut is to open the casing enough for the applied vacuum to grab the casing and move it away from the product transport direction. For this the air nozzles need to blow the cut casing open and against the vacuum roller. With the eye-shape open cut the casing is more flexible and will be opened better by the air nozzle.

These and other objects will be apparent to those skilled in the art.

SUMMARY OF THE INVENTION

A peeler assembly has a carriage that is adjustably and removably mounted to a frame. Adjustably mounted to the carriage is an adjustment screw with an adjustment head and a shaft that extends through a mounting block. Connected to the bottom of the adjustment screw shaft is one or more blade holders configured to cut a casing of sausage. The blade holders preferably extend outwardly and perpendicularly in relation to the shaft and when using a pair, angle inwardly towards one another from the top of the blade holders to the bottom. A blade holder receiving a blade is pivotally connected to the fingers of the knife assembly and is biased downwardly by a spring.

In another embodiment, an apparatus for removing casings from sausages has a frame, and a conduit extending within the frame through which a string of linked sausages are longitudinally moved. A knife means is pivotally mounted in the longitudinal path of the linked sausages and is capable of moving into the recessed portions of the string existing between adjacent ends of the linked product to sever the casing material in that area. Steam is injected into the conduit and diverted through the length thereof to loosen the casing material from the cooked product. The conduit is comprised of a tube with an open end to the peeling side so that the heat of the steam will be retained in the tube around the product and will leak into the peeling area to maintain an environmental temperature of above 150° F. throughout the conduit and the area of the casing slitting and casing removal operations.

DETAILED DESCRIPTION OF THE PREFERRED EMBODIMENTS

Figure 1:
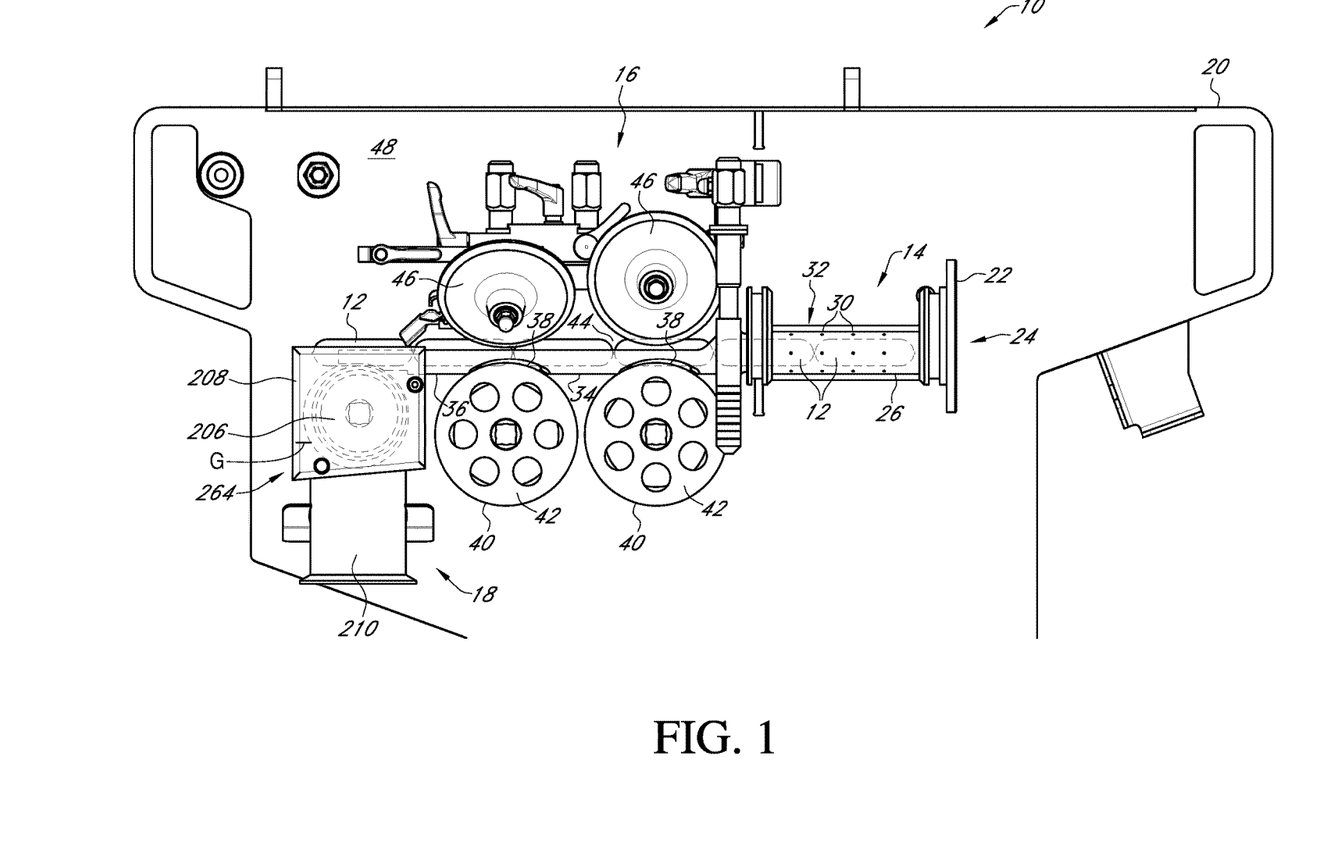
FIG. 1 is a side sectional view of a machine for peeling sausages.

Referring to the figures, a machine 10 for peeling sausages 12 is shown having a steam section 14, a peeling section 16, and a vacuum section 18. The steam section 14 has a housing 20 with a bell 22 at an entry end 24. The bell 22 is connected to a conduit 26 that extends from the bell 22 to a discharge end 28 of housing 20. The conduit 26 has a plurality of holes 30 that are angled toward the center axis of the conduit 26. The conduit 26 is also surrounded by a steam tube 32 that extends from the bell 22 to the discharge end 28 of the housing 20. The steam tube 32 is connected to a source of steam (not shown).

At the discharge end 28 of the housing 20 is the peeling section 16. The peeling section 16 has a guide tube 34 that extends from the discharge end 28 of the housing 20 to a discharge end 36 of the peeling section 16. The guide tube 34 has a pair of openings 38 on the bottom of the tube 34 through which an outer periphery 40 of a pair of transport wheels 42 extend and rotate. The guide tube 34 also has an open top 44 that receives an outer periphery of a pair of hold down wheels 46.

Figure 2:
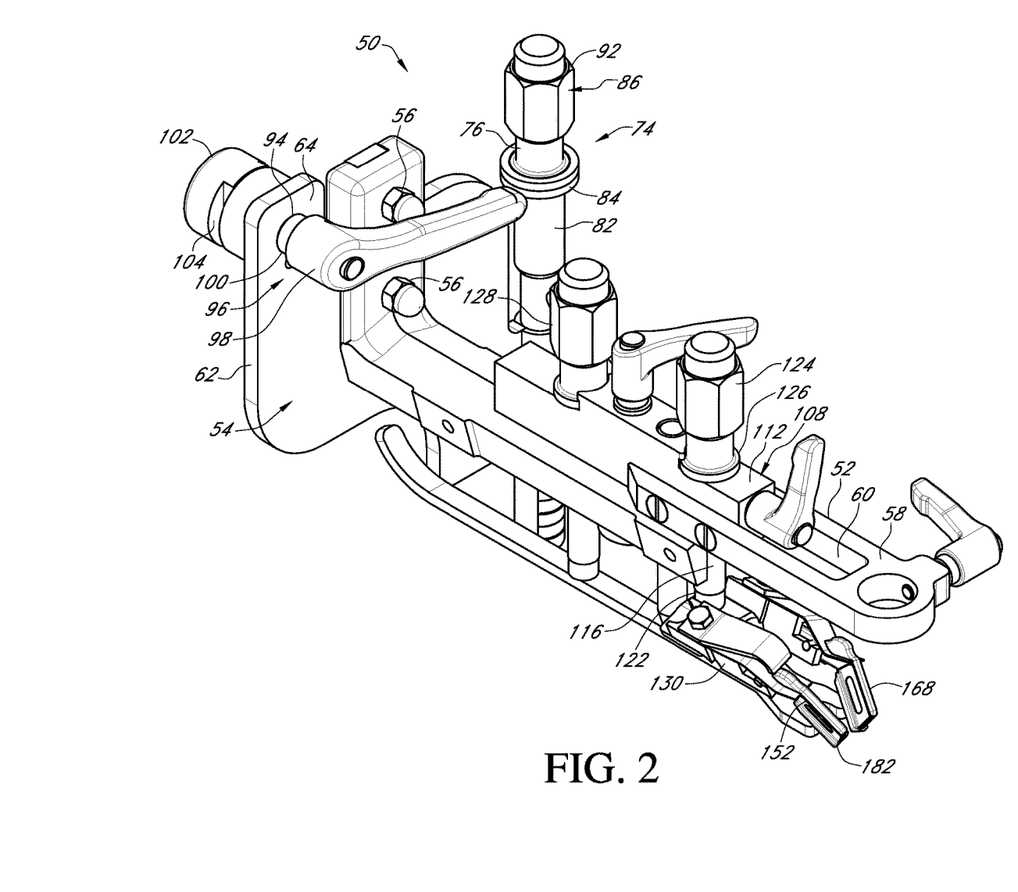
FIG. 2 is a perspective view of a carriage assembly.
Figure 3:
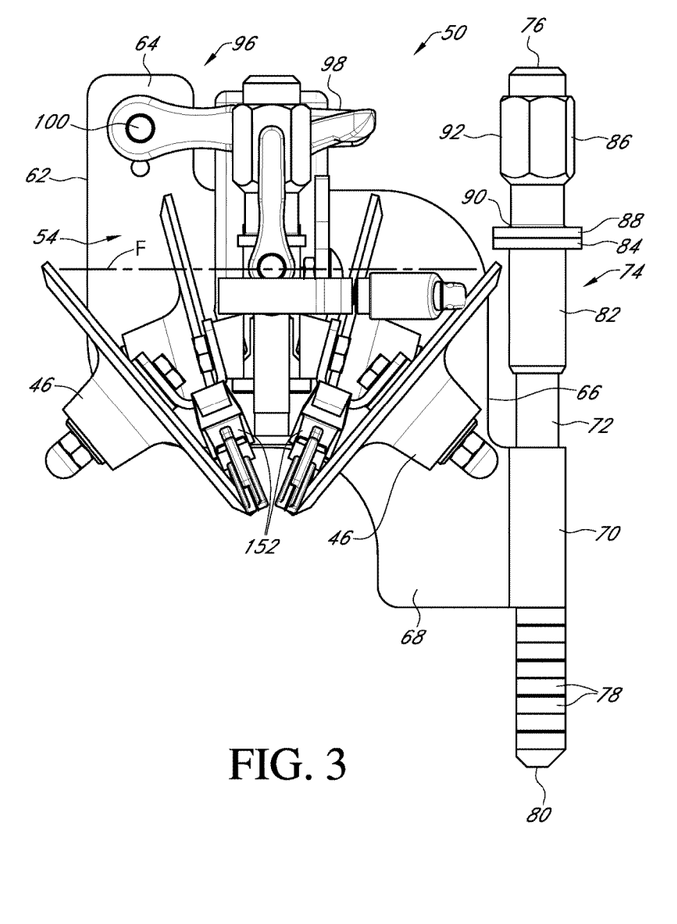
FIG. 3 is an end view of a carriage assembly.

Positioned above the guide tube 34 and adjustably mounted to the frame 48 of machine 10 is a carriage assembly 50. In one example, the carriage assembly 50 has a generally L-shaped elongated member 52 connected to a mounting plate 54 by a pair of bolts 56. A portion of the top surface 58 of the elongated member 52 has a slot 60.

The mounting plate 54 has a first side 62 with an upwardly extending flange 64 and a second side 66 having a downwardly extending flange 68. Flange 68 has an outwardly extending tube 70 that runs along second side 66 and receives and is connected to a shaft 72 of a mounting screw assembly 74. The shaft 72 is threaded at a first or top end 76 and has markers or indicia 78 at the second or bottom end 80.

The shaft 72 extends through a bushing 82 positioned above tube 70. The bushing 82 is received within an opening 83 in the frame 48 and has a boss 84 at a top end that forms a shoulder that engages the frame to create a fixed end position. Threadably connected to the threaded end 76 of shaft 72 is an adjustment nut 86. The adjustment nut 86 has a boss 88 at its lower end 90 that engages boss 84 of bushing 82. The adjustment nut 86 has a head 92 with planar surfaces for ease of gripping.

Extending through an opening 94 on upward flange 64 of the mounting plate 54 is a rotatable clamp assembly 96. The clamp assembly 96 has a handle 98 connected to a shaft 100. The shaft 100 extends through opening 94 and is attached to a rotatable connector 102 at the opposite end. The connector 102 has a slot 104 that receives a part of flange 64 of frame 48.

Figure 4:
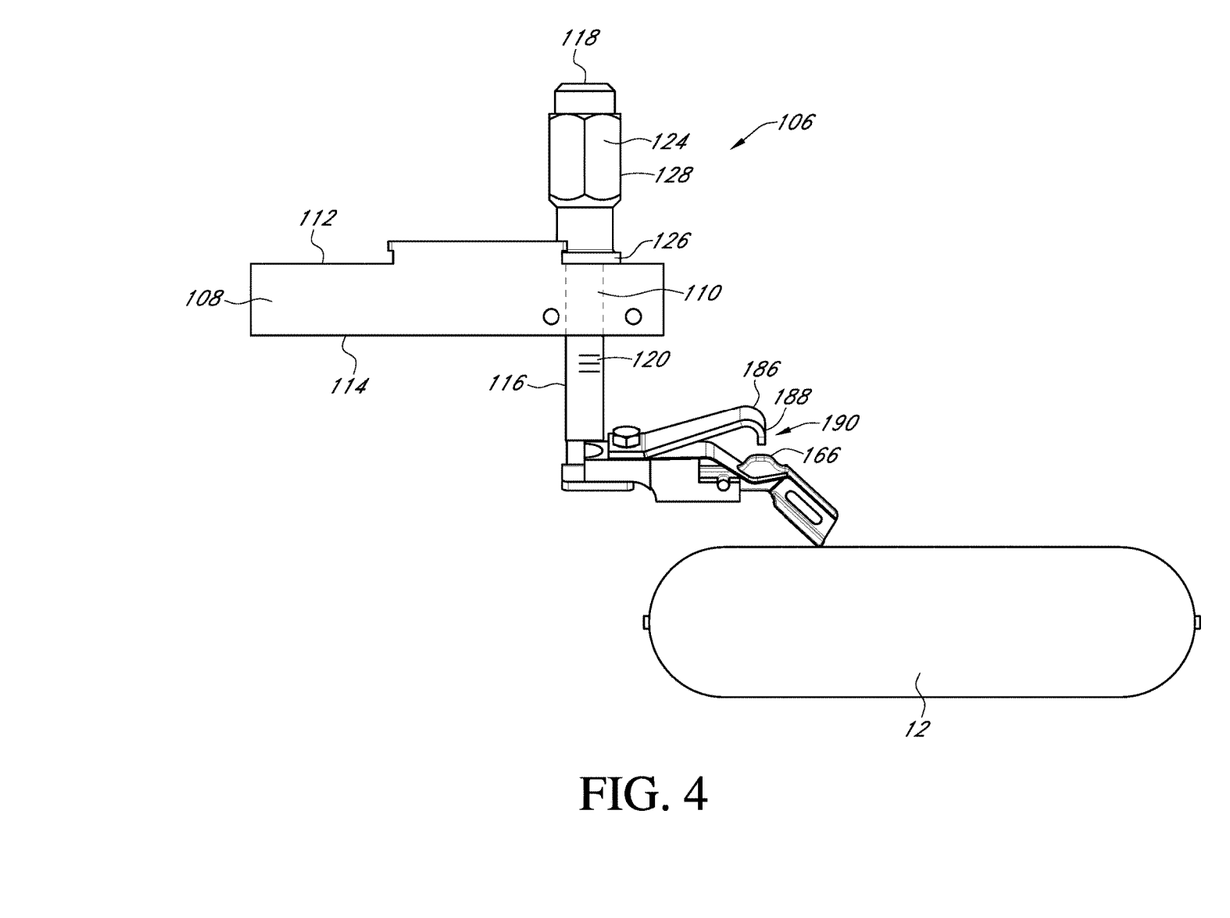
FIG. 4 is a side sectional view of a knife holder assembly.

Connected to elongated member 52 of the carriage assembly 50 is an adjustable knife holding assembly 106. The knife holding assembly 106 has a mounting block 108 that is received within slot 60 of the elongated member 52. A bore 110 extends through the mounting block 108 from a top surface 112 to a bottom surface 114. Extending through bore 110 is an adjustment screw 116. The adjustment screw 116 is threaded at a first end 118 and has markers or indicia 120 at a second end 122.

Threadably connected to the first end 118 of adjustment screw 116 is an adjustment nut 124. The adjustment nut 124 has a boss 126 at one end that engages the top surface 112 of the mounting block 108. Adjacent the opposite end of nut 124 is a head 128 having planar surfaces for gripping.

Figure 7:
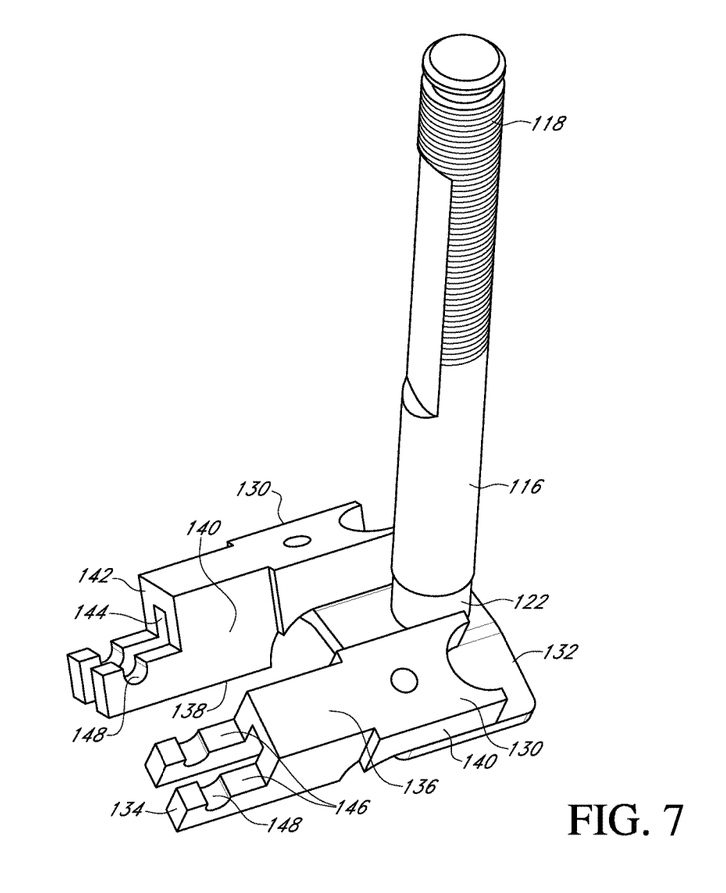
FIG. 7 is a perspective view of an adjustment screw and arms.

Connected to the second end 122 of adjustment screw 116 is one or more arms 130. The arm 130 has a first end 132, a second end 134, a top surface 136, a bottom surface 138, and a pair of sides 140. The top surface 136 extends outwardly from the first end 132 and terminates in a shoulder 142. The shoulder 142 has a centrally located slot 144 that extends from the bottom surface 138 and ends before reaching the top surface 136. Extending outwardly from shoulder 142 to second end 134 in horizontal spaced relation on each side of slot 144 are a pair of fingers 146. Each finger 146 has a slot 148 in the top surface and the slots 148 are positioned to align with each other.

Figure 5:
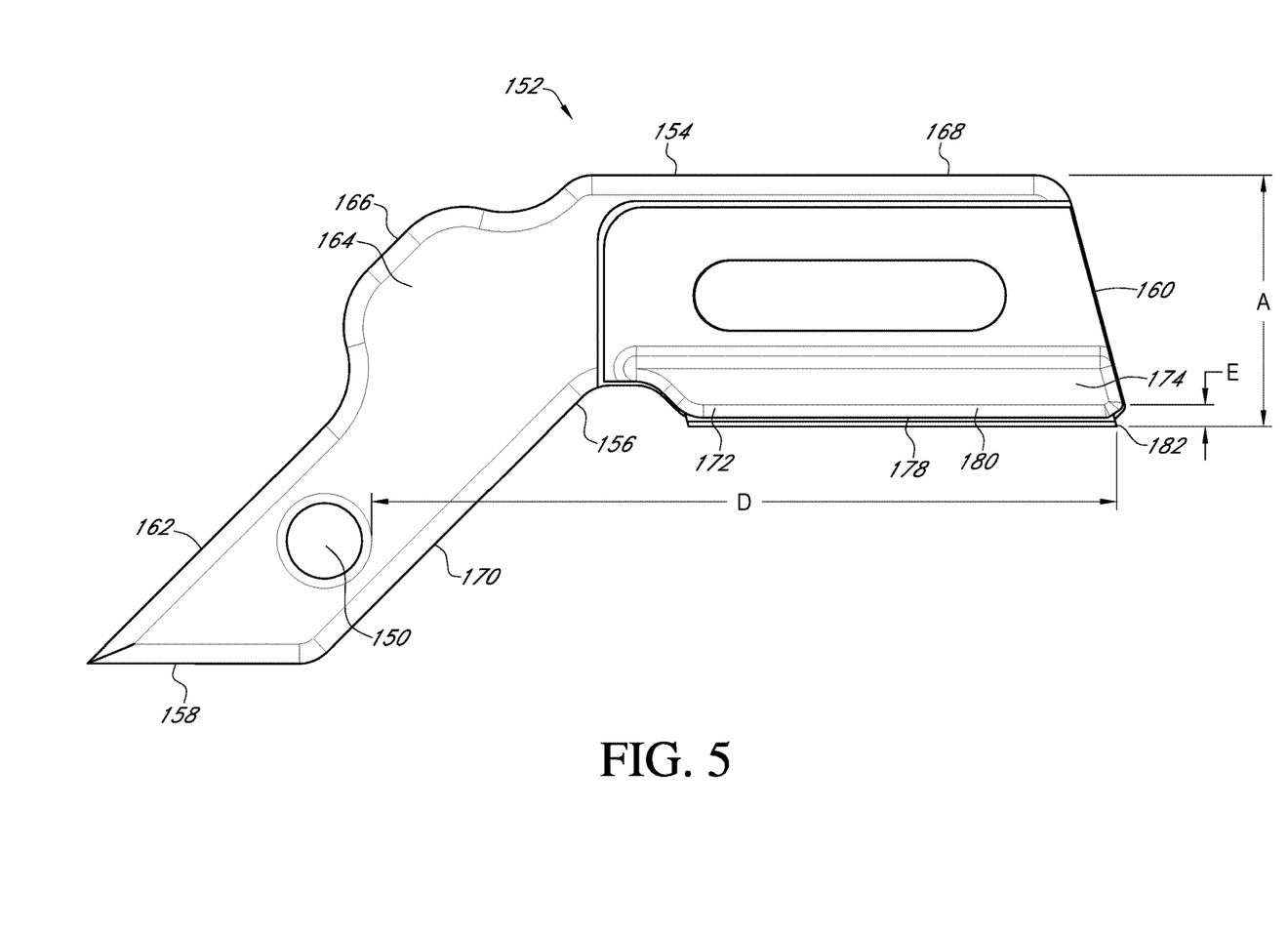
FIG. 5 is a side view of a blade holder.
Figure 6:
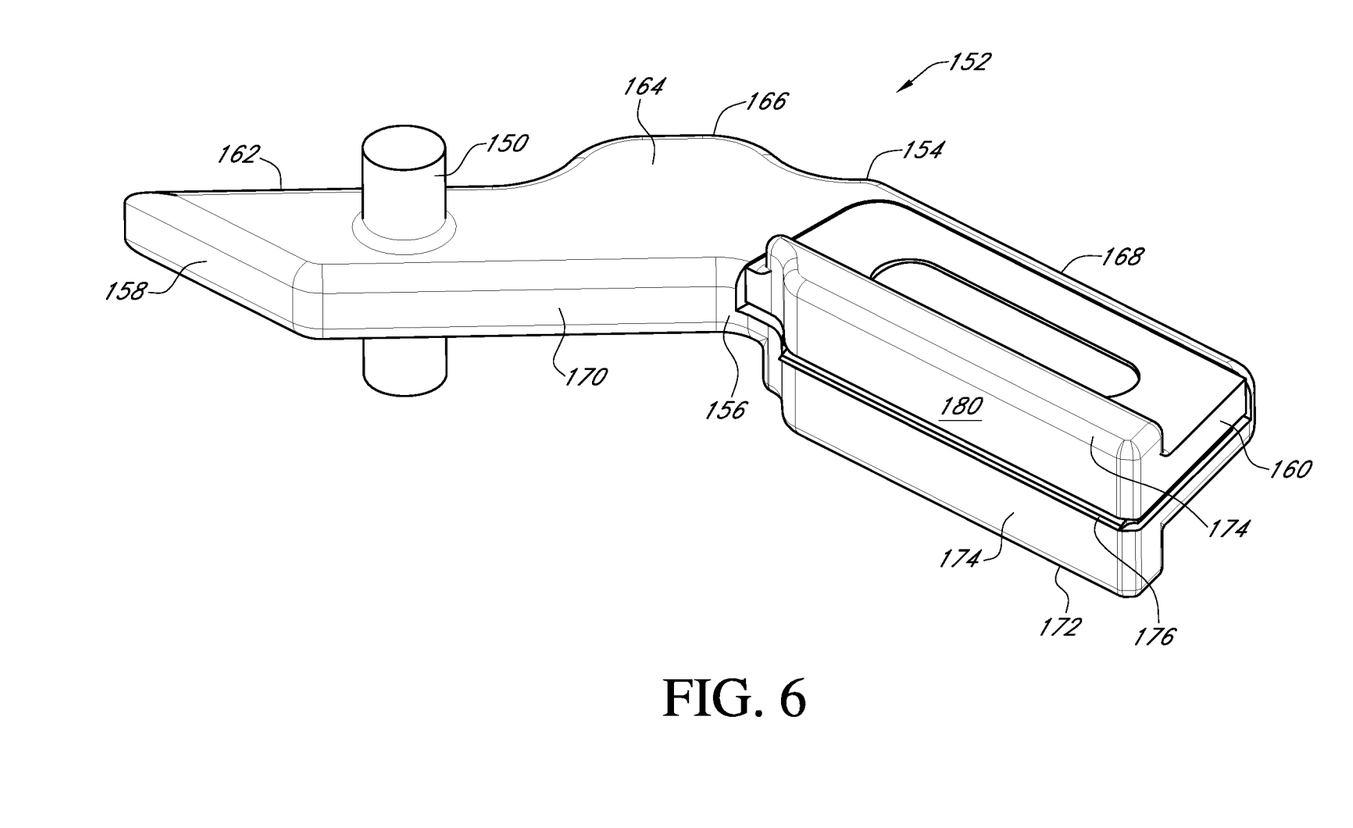
FIG. 6 is a perspective view of a blade holder.

Pivotally received within slots 148 is a pivot pin 150 of a blade holder 152. The blade holder 152 has a top edge 154, a bottom edge 156, a first end 158, and a second end 160. The top edge 154 is of any shape and by way of example, only has a flat section 162 that extends from the first end 158 to a raised section 164 that provides a contact surface 166. As the blade holder 152 extends toward the second end 160, the top edge 154 has a downwardly angled section 168. When the blade holder 152 is pivoted toward shoulder 142, the blade holder 152 is received within slot 144 and the flat section 162 serves as a stop as section 162 engages the top of slot 144. The bottom edge 156 has a first section 170 that extends in parallel spaced relation to flat section 162 and a second section 172 that is angled downwardly in relation to the first section 170. The second section 172 has a pair of flanges 174 that extend outwardly from a centrally located slot 176 that receives a blade 178. The flanges 174 provide a bottom contact surface 180.

The first end 158 is angled toward the second end 160 as the first end 158 extends from the top edge 154 to the bottom edge 156. The second end 160 is angled away from the first end 158 as the second end 160 extends from the top edge 154 to the bottom edge 156. With the adjustment of the total carriage, the angle of where the blade 178 engages the sausage 12 will be different. Therefore, there is a need for the blade 178 to be able to travel over a range of angles. To achieve this, a tip 182 of the blade 178 is preferred to fall within an angle ranging from 50° and 80° and in an exemplary embodiment is 75°. In other words, the angle between the second end 160 and section 168 of the bottom edge 156 preferably is within a range of 50° to 80° as shown in FIG. 5. This angle is necessary to be able to enter the space at the twist between two sausages 12. When engaged, the blade 178 will cut into the end of the sausage 12 and travel upwardly out of the twist over the end of the long flat side of the sausage 12.

Figure 8:
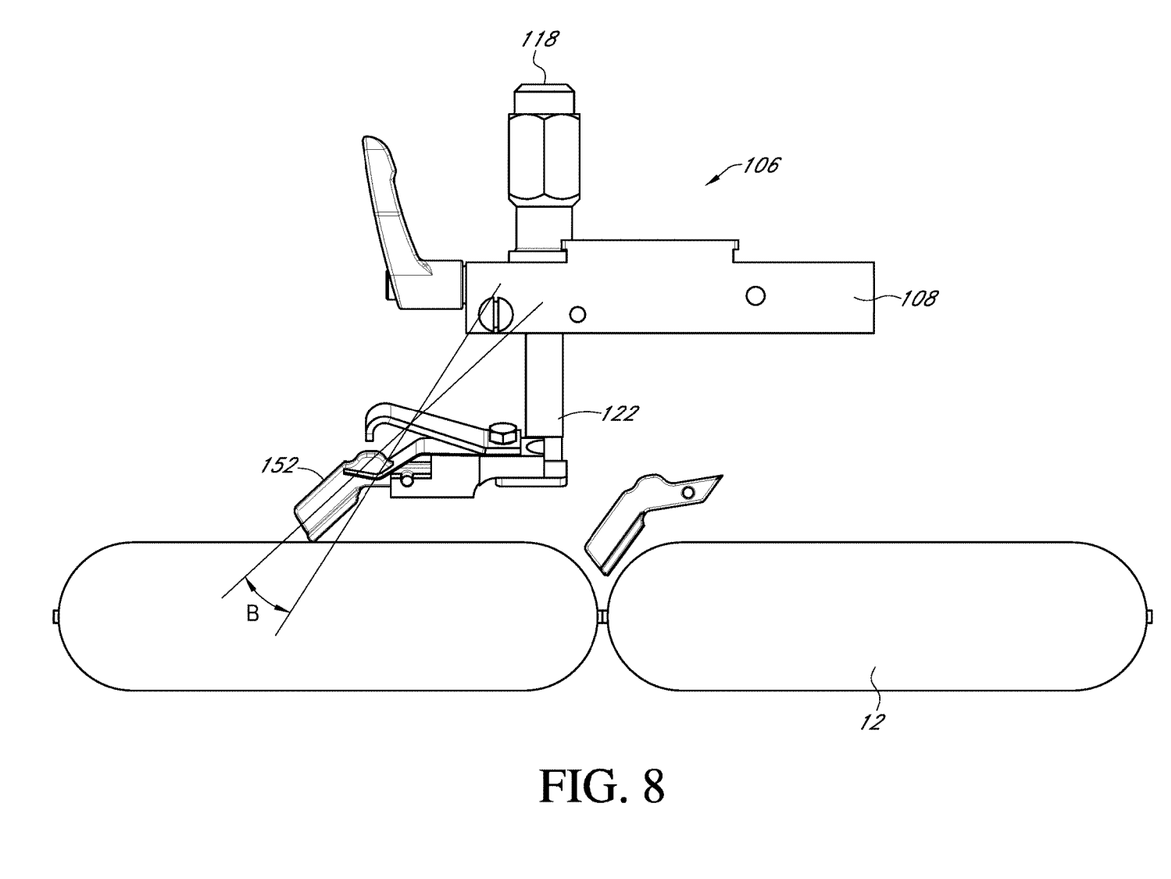
FIG. 8 is a side view of a knife holder assembly showing an angle of travel.

Also, to accommodate the peeling of a large range of sausages 12 having different diameters, an angle of travel B from a first position to a second position is preferred to be between 20° and 30° and ideally 25°. The first position is defined as the position of blade holder 152 when the holder 152 enters the space between two sausages 12 at the twist. The second position is defined as the position of the blade holder 152 as the holder 152 travels over the long flat side of the sausage.

In addition, to accommodate the peeling of sausages having different diameters preferred is that the distance D from the pivot point of pivot pin 150 to the blade tip 182 in the horizontal be approximately 1.229 inches (31 mm) and the distance A in the vertical be approximately 0.178 inches (4.52 mm). Also, the distance E that the blade 178 extends out of slot 176 beyond the bottom contact surface 180 is preferred to be approximately 0.008 inches (0.2 mm) and the distance that the tip 182 extends beyond the second end 160 is preferred to be 0.013 inches (0.33 mm). Otherwise, the blade may cut into the meat of the sausage 12 when peeling the casing.

Connected to the top surface 136 of the arm 130 by a bolt 184 is a spring 186. Preferably, the spring 186 extends outwardly above the blade holder 152 and is shaped to engage the contact surface 166 of the top edge 154 of the blade holder 152. In one example, the spring 186 has a section 188 that extends downwardly to the contact surface 166 and then extends upwardly to an outer end 190. The spring 186 provides a pre-tension downward force when the blade holder 152 is in a first position and a linear spring force as the blade holder 152 moves to a second position. The upwardly angled outer end 190 provides a guide for attachment of the blade holder 152 to the arm 130. When more than one arm 130 is utilized, the arms 130 are preferably angled inwardly from top to bottom in relation to one another.

Rotatably connected to the outer sides 140 of the blade holder 152 are the hold down wheels 46 that angle inwardly from top to bottom. The angle F of the hold down wheels 46 in relation to one another is between 20° and 40° and ideally is 30° for standard hot dogs and cocktail wieners. For larger diameters, the angle F will need to be adjusted. The hold down wheels 46 are positioned with the knife holding assembly 106 to extend through an opening 44 of guide tube 34 to exert a force on the sausage 12 to slightly stretch the casing between the wheels 192. With the right amount of tension exerted on the casing by the wheels 192, the blade 178 will easily cut the casing such that the casing will tear open with the slightest contact of the blade 178.

Figure 9:
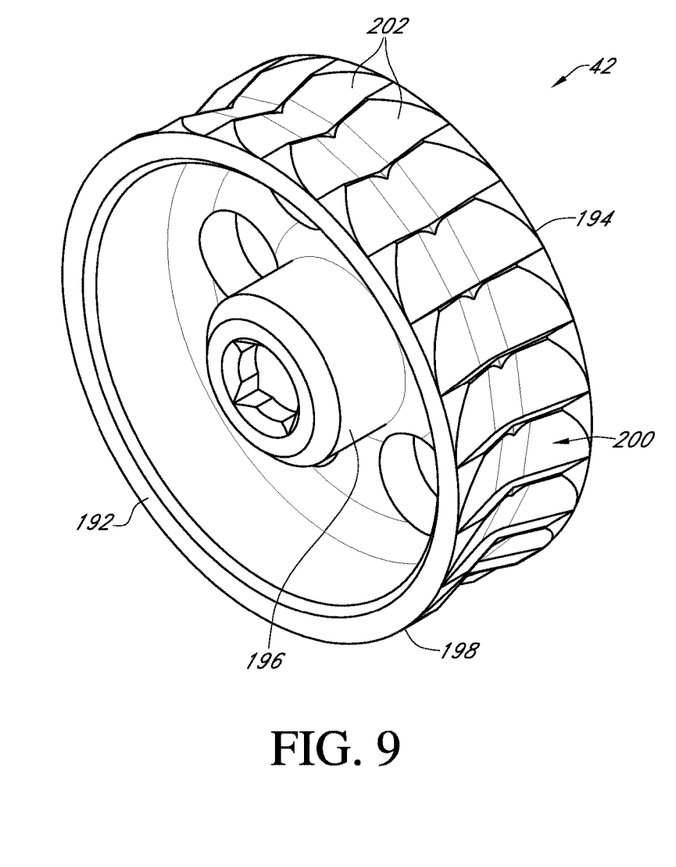
FIG. 9 is a perspective view of a transport wheel.

The transport wheels 42 positioned below the hold down wheels 46 are of any type. In one preferred embodiment, the transport wheels 42 are circular having a first side 192 and a second side 194 and a centrally located hub 196 for mounting the wheel 42 to a drive shaft (not shown). To avoid the risk of losing small parts, such as a key, the hub 196 is square to eliminate the need for an anti-rotation key to remove the wheels 42 for cleaning.

The outer periphery of the wheels 42 form rims 198 that define a concave transport surface 200. The transport surface 200 has a plurality of equally spaced teeth 202 or overlapping layers that are formed with a round mill around the circumference of the wheels 42. The teeth 202 are then hand polished followed by electro polishing to dull the teeth 202 so that they grip the sausage 12 for transport without damaging the sausage 12.

Figure 10:
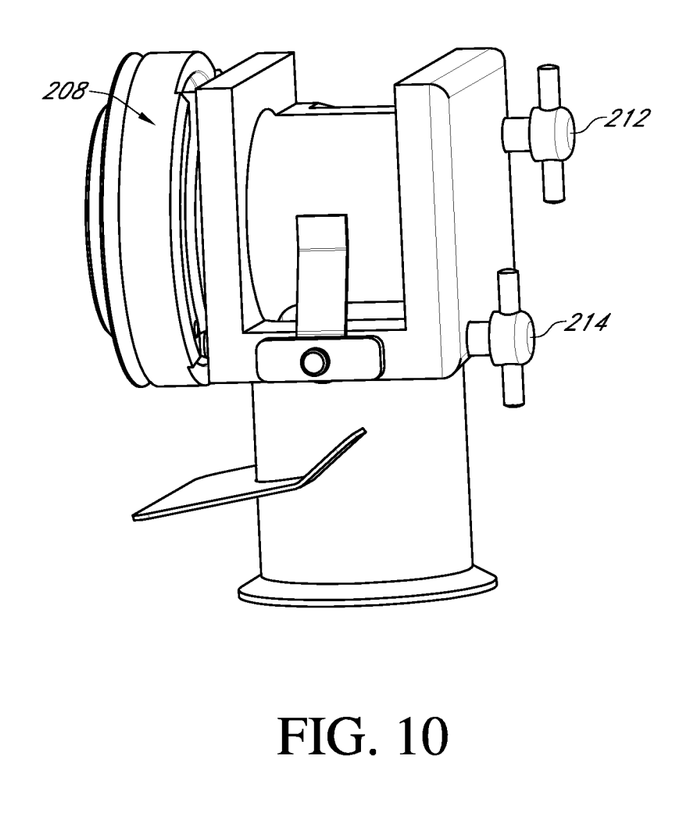
FIG. 10 is a perspective view of a vacuum block.

Downstream of the transport wheels 42 is a vacuum assembly 204. The vacuum assembly 204 includes a vacuum wheel 206 having a plurality of holes in communication with a vacuum source. Adjacent the vacuum wheel 206 is a vacuum block 208 and below the vacuum wheel 206 is vacuum piping 210. The vacuum block 208 is positioned to form a small gap between the vacuum wheel 206 and the vacuum block 208 and is preferably positioned to form an angle G between the vacuum wheel 206 and the vacuum block 208 of between 57° to 67° and ideally 62°. The vacuum block 208 also has a pair of fixation or positioning screws 212 and 214. Positioning screw 212 locks the guide tube 34 to the vacuum block 208 to align the vacuum wheel 206 with the transport wheels 42 and the hold down wheels 46. Positioning screw 214 locks the vacuum block 208 to the peeler frame 48.

In a preferred embodiment, the distance between the tip 182 of the blade 178 and the top or center line of the vacuum wheel 206 is between 3.347 inches (85 mm) and 4.13 inches (105 mm) and ideally 3.740 inches (95 mm) for standard hot dogs, and between 0.669 inches (17 mm) and 1.457 inches (37 mm) and ideally 1.063 inches (27 mm) for cocktail wieners. Connected to the frame 48 between the knife holder assembly 106 and the vacuum wheel 206 is an air nozzle 216 positioned to blow open the cut on the casing. Preferably, the distance from the tip 182 of the blade 178 to the air nozzle 216 is between 1.772 inches (45 mm) and 2.008 inches (51 mm) and ideally 1.890 inches (48 mm) for standard hot dogs and between 0.748 inches (19 mm) and 0.906 inches (23 mm) and ideally 0.859 inches (21 mm) for cocktail wieners. Alternatively one or more air nozzles 216 are positioned at the second end 123 of adjustment screw 116. When multiple cuts are made in the sausage multiple nozzles 216 are provided for each cut. Preferably, as the sausage is transported downstream the nozzles 216 are spaced further apart.

In operation, the carriage assembly 50 is adjusted toward and away from sausages 12 to accommodate different diameters of sausages by turning adjustment nut 86. As a result, shaft 72 moves up and down within bushing 82 to produce a very precise, fixed and reproducible height adjustment of the carriage assembly 50 in relation to frame 48. The marking 78 on the lower end 80 of shaft 72 provides for a quick adjustment based on diameter size.

The knife holder assembly 106 is also adjusted toward and away from the centerline of the sausages 12 independently of the carriage assembly 52 by turning the adjustment nut 124. As a result, adjustment screw 116 is raised and lowered in relation to the boss 126 which provides for a precise, fixed and reproducible height adjustment of the knife holding assembly 106 in relation to the carriage assembly 50. Markings 120 on adjustment screw 116 provides for setting reproducible positions.

Once the carriage assembly 50 and the knife holder assembly 106 are adjusted, a strand of sausages 12 are fed into the entry end 24 of conduit 26 of the steam section 14. As the sausages 12 are transported through conduit 26, steam flows through holes 30 which expands the casing and loosens the casing from the meat. The temperature does not heat the core of product, but is sufficient to avoid bacterial growth on the surface of the product and in the environment of the device.

As the sausage 12 strand exits the discharge end 28 of conduit 26, the sausages are gripped and transported by transport wheels 42 underneath the hold down wheels 46 and the knife holder assembly 106. Based on the shape and dimensions of the blade holder 152, the tip 182 of the blade 178 engages the end of the sausage 12. The downward force of the spring 186 against the contact surface 166 of the blade holder 152 causes the tip 182 of the blade 178 to penetrate and cut the end of the sausage 12 casing. The bottom contact surface 180 of the blade holder 152 rides over the sausage surface 12 and prevents a cut deeper than tip 182 of the blade 178 that extends out of the blade holder 152. As the sausage 12 continues to travel downstream, the spring 186 provides a resistive linear force to produce a longitudinal cut along the length of the sausage 12.

As the cut sausage 12 exits the carriage assembly 50, the air nozzle 216 blows open the cut or cuts made in the casing. Once blown open, the casing is grabbed by the vacuum wheel 206. When transported by the vacuum wheel 206, the casing hits the vacuum block 208. Because of the angle between the vacuum block 208 and the vacuum wheel 206, the vacuum block 208 will catch the casing and assist in transporting the casing downward on the transport wheel 206 to the vacuum side of the peeler. On the vacuum side of the vacuum wheel 206, the casing releases and from the vacuum wheel 206 is transported down the vacuum piping 210 for disposal. Preferably, the vacuum block 208 is pressed against the vacuum wheel 206 to make the gap as small as possible.

Peeling performance of cocktails (short sausage products) is greatly affected by the product length, low weight of the sausage product to be removed from the casing, number of twist to form the constrictions, and knife position and length of the actual cut. When cutting a straight cut product, the casing needs to be opened for the product to be released. The short products have a short cut and it is very difficult to open the casing enough to catch it with the vacuum applied and to physically move the sausage product out of the small opening cut in the casing.

If the casing is not adequately cut at the ends of sausages, the sausages are not appropriately released from the casing, leading to product jams which halt operation. As a result the peeling process of short products is often stopped for casing jams, non-peeled products, etc. and needs much more operator attention than necessary.

Accordingly, a machine for peeling sausages has been disclosed that at the very least meets all of its stated objectives.

What is claimed is:
1. A machine for peeling sausages, comprising:
  a carriage assembly having a mounting plate connected to a frame;
  a mounting screw assembly adjustably connected to the frame and the mounting plate;

wherein the mounting screw assembly is configured to adjust the position for the carriage assembly based upon a diameter of a sausage to a precise and reproducible position; and a knife holder assembly having at least one blade holder that is configured to adjust a height of the at least one blade holder independently of adjusting the height of the carriage assembly.

2. The machine of claim 1 wherein the mounting screw assembly includes an adjustable screw having threads at a first end and markings adjacent the second end.

3. The machine of claim 2 further comprising a bushing with a boss that receives the adjustable screw and an adjustable nut having a boss that is threadably received on the first end of the adjustable shaft.

4. A machine for peeling sausages, comprising:
a carriage assembly that is adjustably mounted to a frame;
a knife holding assembly having at least one knife that is adjustably mounted to an elongated member of the carriage assembly;
wherein the knife holding assembly is configured to adjust the position of the knife in a precise and repeatable manner independent of an adjustment of a position of the carriage assembly.

5. The machine of claim 4 wherein the knife holding assembly has an adjustment screw that extends through a bore in a mounting block.

6. The machine of claim 5 wherein an adjustment nut is threadably attached to a first end of the adjustment screw and a second end of the adjustment screw has markings.

7. The machine of claim 4 wherein the knife assembly has a blade holder having an angle between an outer end of the blade holder and a bottom edge of the blade holder that ranges between 50 and 80 degrees.

8. The machine of claim 4 wherein the blade holder is configured to have an angle of travel between a first position and a second position ranging between 20 and 30 degrees.

9. The machine of claim 4 wherein a pair of hold down wheels are rotatably connected to the knife holding assembly and angle inwardly from top to bottom.

10. A machine for peeling sausages, comprising:
an adjustable carriage assembly mounted to a frame;
an adjustable knife assembly mounted to the carriage assembly;
a pair of transport wheels mounted to a drive shaft wherein the transport wheels have a transport surface that extends around a circumference of the transport wheels that includes equally spaced overlapping teeth.

11. The machine of claim 10 wherein the transport wheels have a square hub that receives the drive shaft.

12. A machine for peeling sausages, comprising:
a carriage assembly adjustably mounted to a frame;
a knife holding assembly adjustably mounted to the carriage assembly; and
a vacuum assembly having a vacuum block with a first and a second positioning screw.

13. The machine of claim 12 wherein the vacuum block is positioned to form an angle between the vacuum block and a vacuum wheel that ranges between 57 and 67 degrees.

14. The machine of claim 12 wherein the first positioning screw is configured to lock a guide tube to the vacuum block to align a vacuum wheel with transport wheels and hold down wheels.

15. The machine of claim 12 wherein the second positioning screw is configured to adjust the position of the vacuum block relative to the frame and lock the vacuum block in place.

16. The machine of claim 12 wherein a distance between a top of a vacuum wheel and a tip of a blade in a blade holder of the knife assembly is between 3.347 inches (85 mm) to 4.13 inches (105 mm).

17. The machine of claim 12 wherein a distance between a top of a vacuum wheel and a tip of a blade in a blade holder of the knife assembly is between 0.669 inches (17 mm) to 1.457 inches (37 mm).

18. The machine of claim 12 wherein an air nozzle is positioned between a vacuum wheel and a tip of a blade in a blade holder of the knife assembly.

19. A machine for peeling sausages, comprising:
a carriage assembly adjustably mounted to a frame;
a knife holder assembly adjustably mounted to the carriage assembly;
wherein the knife holder assembly includes at least two blades.

20. The machine of claim 19 wherein the at least two blades are received in blade holders pivotally connected to arms.

21. The machine of claim 20 wherein the arms are connected to an adjustable shaft of the knife assembly.

* * * * *